(12) United States Patent
Sone et al.

(10) Patent No.: US 6,534,880 B1
(45) Date of Patent: Mar. 18, 2003

(54) ROTOR OF MAGNETO GENERATOR FOR INTERNAL COMBUSTION ENGINE

(75) Inventors: Kazuya Sone, Mori-machi (JP); Kazuyoshi Takagi, Mori-machi (JP)

(73) Assignee: Kabushiki Kaisha Moric, Mori-machi (JP)

(*) Notice: Subject to any disclaimer, the term of this patent is extended or adjusted under 35 U.S.C. 154(b) by 0 days.

(21) Appl. No.: 09/699,571

(22) Filed: Oct. 30, 2000

(30) Foreign Application Priority Data

Nov. 8, 1999 (JP) .......................................... 11-316488

(51) Int. Cl.⁷ ................................................ H02P 9/04
(52) U.S. Cl. ...................................... 290/1 R; 310/153
(58) Field of Search ................... 290/1 R, 46; 310/67 A, 310/153

(56) References Cited

U.S. PATENT DOCUMENTS

| | | | | |
|---|---|---|---|---|
| 3,781,137 A | * | 12/1973 | Engstrom | 123/198 C |
| 4,137,884 A | * | 2/1979 | Odazima et al. | 123/149 D |
| 4,218,193 A | * | 8/1980 | Mehne | 123/198 C |
| 4,317,435 A | * | 3/1982 | Kohlhage | 123/179.22 |
| 4,433,473 A | * | 2/1984 | Benedetti | 29/423 |
| 4,735,299 A | * | 4/1988 | Ohuchi | 192/45 |
| 4,754,859 A | * | 7/1988 | Ouchi et al. | 192/45 |
| 4,877,986 A | * | 10/1989 | Shimizu | 29/598 |
| 4,918,323 A | * | 4/1990 | Aso | 290/46 |
| 5,495,833 A | * | 3/1996 | Ishizaka et al. | 123/179.25 |
| 5,524,597 A | * | 6/1996 | Hiki et al. | 123/198 E |
| 6,053,155 A | * | 4/2000 | Kashima | 123/196 W |

FOREIGN PATENT DOCUMENTS

| JP | 56074098 A | * | 11/1982 |
| JP | 2-248651 A | * | 4/1990 |

* cited by examiner

Primary Examiner—Joseph Waks
(74) Attorney, Agent, or Firm—Ernest A. Beutler

(57) ABSTRACT

An improved flywheel rotor for a magneto generator of an internal combustion engine. The construction offers simplicity from the prior art construction since on a single series of threaded fasteners is employed for securing all of the components, which includes a protective shield for the permanent magnets together.

11 Claims, 3 Drawing Sheets

ROTOR OF MAGNETO GENERATOR FOR INTERNAL COMBUSTION ENGINE

BACKGROUND OF THE INVENTION

This invention relates to a magneto generator for an internal combustion engine and more particularly to an improved and simplified manner of forming such a construction and attaching it to the crankshaft of the associated engine.

Conventionally with a wide variety of types of engines, particularly but not limited to those of the small displacement type, a projecting end of the crankshaft has attached to it a flywheel, a starter mechanism and magneto generator assembly. These mechanisms comprise a number of component parts that are connected to each other by a plurality of different types of fasteners. In addition, it is also the common practice to provide a protective coating over the permanent magnets of the magneto generator to protect them. These structures have a number of defects, which may be best understood by reference to FIG. 1 which is a figure showing a conventional prior art type of construction.

An associated engine has a crankshaft, indicated generally by the reference numeral 11, which protrudes through an end face of the associated crankcase in which the crankshaft 11 is journalled in a well known manner. A flywheel magneto starter assembly, indicated generally by the reference numeral 12, is affixed to the crankshaft 11 in a manner that will be described. This flywheel magneto starter assembly 12 includes a number of components including a mounting boss member, indicated generally by the reference numeral 13 and which has a flange portion 14 that is generally cylindrical in shape. The flange portion 14 is integrally formed with a cylindrical sleeve part 15 and which has an internal bore 16 that is received over a tapered end of the crankshaft 11. A key 17 is positioned in a key groove 18 formed in the crankshaft 11 and in a slot formed in the sleeve bore 16 so as to non-rotatably affix the mounting boss member 13 to the crankshaft 11.

A flywheel magneto member 19 is affixed, in a manner to be described, to the mounting boss member 13 and cooperates with a stator 21 that is fixed to the engine body. The flywheel magneto assembly 12 generates electrical power for, among other things, the ignition of the associated engine.

The flywheel magneto member 19 has a generally cup-shape comprised of a cylindrical flange 22 and an end wall 23. Carried on the inner periphery of the cylindrical portion 22 are a plurality of permanent magnets 24 that cooperate with the stator 21 so as to generate an electrical current therethrough on rotation of the flywheel magneto assembly 12 with the crankshaft 11.

The flywheel magneto member 19 is affixed to the mounting boss member 13 by means of a plurality of rivets, indicated by the reference numeral 25. These rivets 25 have headed portions that are disposed on one side of the end wall 23 and conical portions that are received in correspondingly machined openings 26 formed in the mounting boss member 13. The conical portions 26 are required in order to clear a one-way clutch assembly, indicated generally by the reference numeral 27 which is associated with a starter gear 28 that is journalled on the crankshaft 11 and has teeth on its outer periphery. A starter motor is engaged with these teeth for rotating the starter gear 28.

The one-way clutch 27 includes an inner race that is formed by a hub 29 of the starter gear 28 and which drives a plurality of sprags 31 and retainers 32 for driving an outer race 33. The outer race 33 has tapped openings that receive threaded fasteners 34. The threaded fasteners 34 are socket headed screws and pass through enlarged openings in the flywheel end wall 23 so as to affix the outer race 33 to the mounting boss member 13.

Finally, spacers 35 are positioned internally of the permanent magnets 28 to space them at a fixed distance from the end wall 23 and a protective covering 36 covers the surfaces of the permanent magnets 24 so as to protect them. The protective casing 36 is made from a non-magnetic material such as stainless steel and is adhesively bonded to the permanent magnets 24.

It should be readily apparent from the foregoing description that the prior art type construction is rather time consuming to manufacturer and assemble. The problems associated with the use of the fastening rivets 25 have already been touched upon. In addition, the use of the separate threaded fasteners for securing the hub portion 13 to the one-way clutch outer race 33 adds to the number of fasteners in the area and thus, weakens the overall assembly. The use of the relatively large number of fasteners and the associated holes through which they pass requires thickening of these members which adds weight in an area where it aids little to the flywheel effect. It would be better to have the added material on the outer periphery where the effect would be greater.

Furthermore, the adhesive bonding of the protective cover 36 to the permanent magnets 24 gives rise to not only a messy operation but also requires time for setting before the assembly can be completed and used.

It, therefore, a principal object to this invention to provide an improved flywheel magneto for an internal combustion engine.

It is a further object to this invention to provide an improved, simplified lower cost and better performing flywheel magneto that offsets the disadvantages noted.

SUMMARY OF THE INVENTION

A first feature of the invention is embodied in a flywheel rotor of a magneto generator for an internal combustion engine for rotating together with a crankshaft of the engine. The flywheel rotor comprises a mounting member having a sleeve portion adapted to be nonrotatably secured on the crankshaft and a flange portion formed integrally with the sleeve portion. The flange portion is generally in the shape of a disc. An engine starter component is disposed on one side of the flange portion and a flywheel member generally in the shape of a cup is disposed on the other side of the flange portion. A plurality of circumferentially spaced permanent magnets are affixed on the inner surface of the flywheel member. A plurality of threaded fasteners, each having portions extending axially through each of the flange portion, the engine starter component and the flywheel forming the sole connection between the mounting member, the engine starter component and the flywheel member.

Another feature of the invention is also embodied in a flywheel rotor of a magneto generator for an internal combustion engine for rotating together with a crankshaft of the engine. In accordance with this feature, the flywheel rotor also comprises a mounting member having a sleeve portion adapted to be nonrotatably secured on the crankshaft and a flange portion formed integrally with the sleeve portion. The flange portion is generally in the shape of a disc. An engine starter component is disposed on one side of the flange portion and a flywheel member generally in the shape of a cup is disposed on the other side of the flange portion. A plurality of circumferentially spaced permanent magnets are affixed on the inner surface of the flywheel member. A permanent magnet protection casing generally in the shape of a cup is received within the flywheel member in close contact with inner surfaces of the permanent magnets. A plurality of fasteners affix the engine starter component, the flywheel, the boss member and the permanent magnet protection casing to each other.

DETAILED DESCRIPTION OF THE PREFERRED EMBODIMENT OF THE INVENTION

Figure 1:
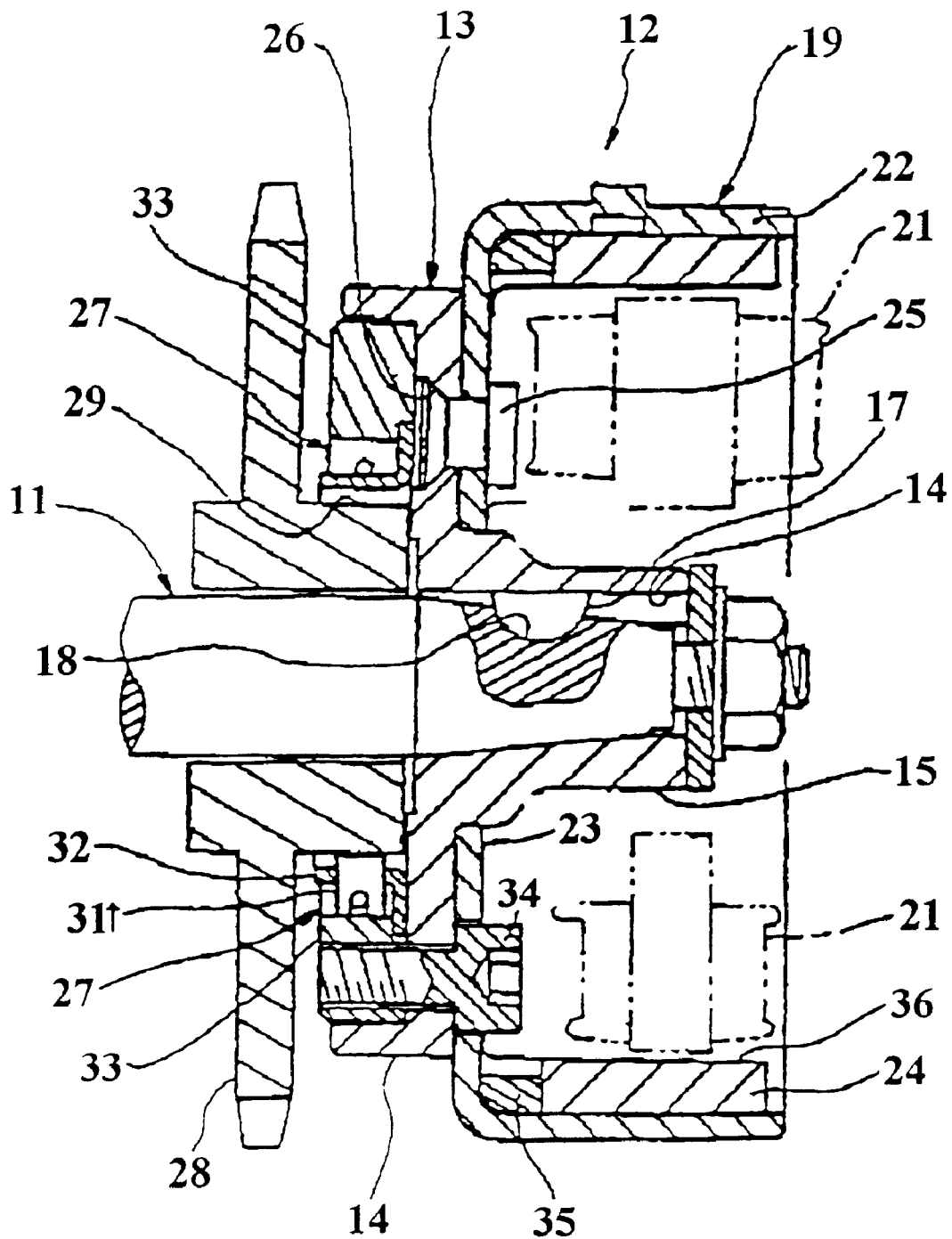
FIG. 1 is a cross sectional view showing the flywheel magneto generator of a prior art type of construction.
Figure 2:
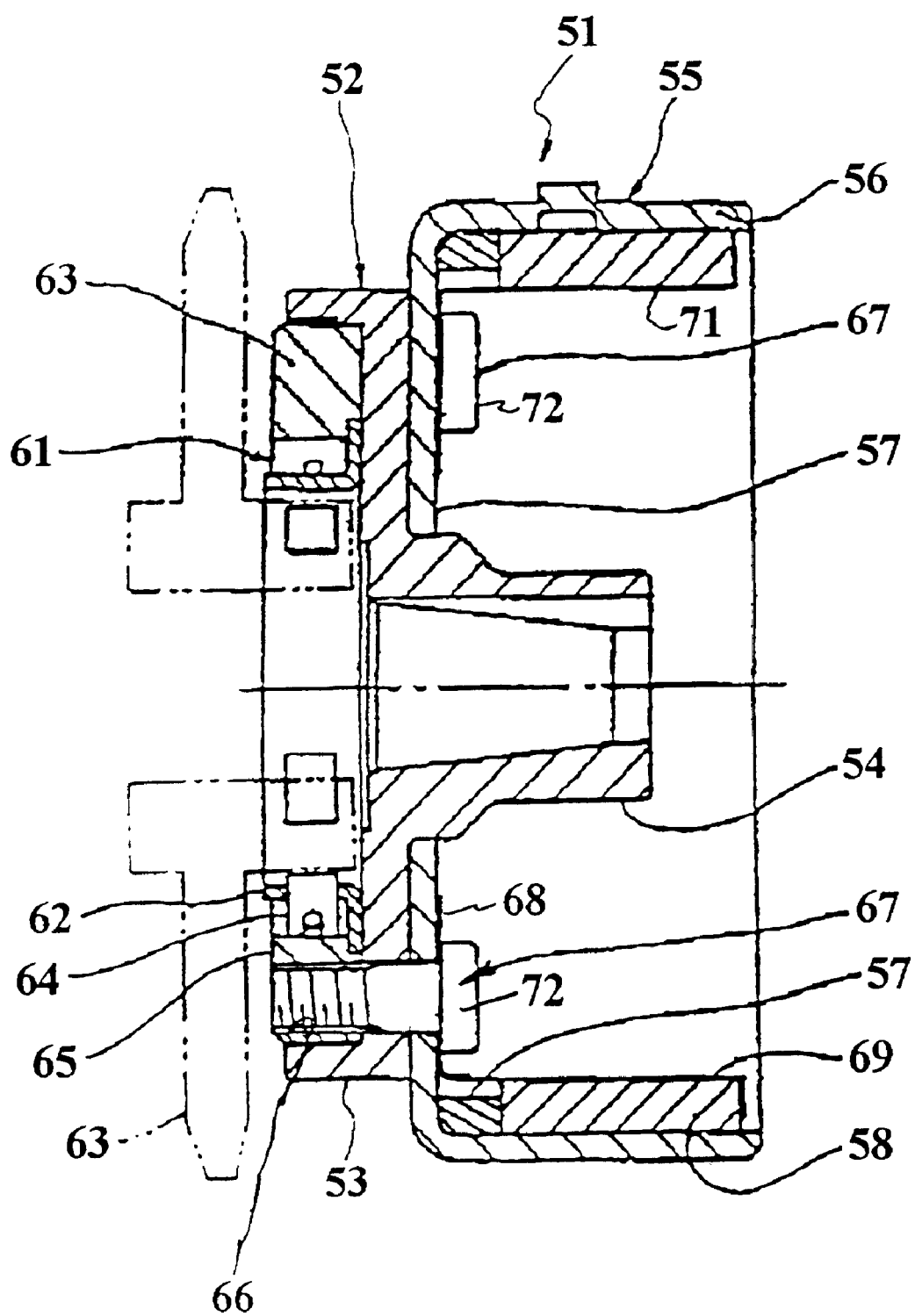
FIG. 2 is a cross sectional view, in part similar to FIG. 1, and shows an embodiment of the invention.
Figure 3:
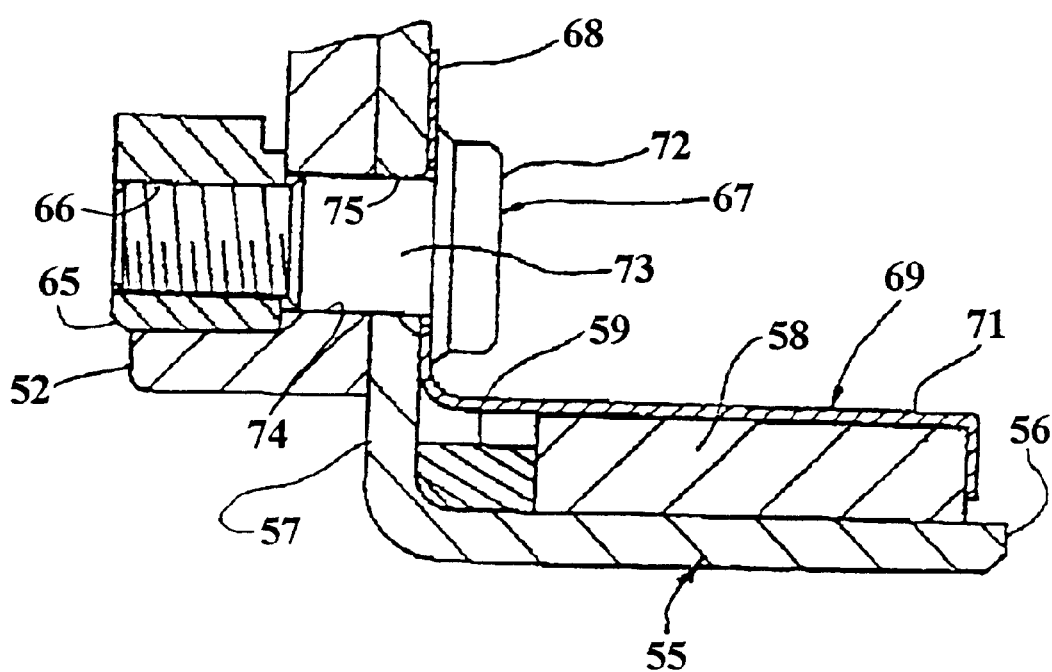
FIG. 3 is an enlarged view of the portion of the structure shown in lower part of FIG. 3 and more clearly show the details.

Referring now to FIGS. 2 and 3, a flywheel magneto assembly constructed in accordance with an embodiment of the invention is identified generally by the reference numeral 51. This flywheel magneto 51 includes a mounting boss member 52 which basically has a construction similar to that of the prior art, having a cylindrical flange portion 53 and a sleeve portion 54. The sleeve portion 54 is adapted to be received on and non-rotatably connected to one end of an engine crankshaft (not shown).

A flywheel rotor 55 has a generally cup-shape comprised of a cylindrical portion 56 and an end wall 57 that is abuttingly engaged with one side of the flange portion 53. Permanent magnets 58 are affixed in a suitable manner on the inner periphery of the cylindrical portion 56 and are held in spaced relationship to the end wall 57 by means of spacers 59.

A one-way clutch 61 is disposed in a recess on the opposite side of the flange portion 53 and is comprised of a plurality of sprags 62 that are associated with the hub of the starter gear, shown in phantom and indicated generally by the reference numeral 63. These sprags 62 are retained by a retainer 64 and are engaged with an outer race 65 of the one-way clutch 61. The outer race 64 is formed with a plurality of circumferentially spaced tapped openings 66.

Threaded fasteners 67, preferably of the socket-headed screw type, have their head portions engaged with a flange 68 of a protective member 69 for the permanent magnets 58. This protective member 69 has a cylindrical portion 71, which extends over the spacers 59 and protects the inner surface of the permanent magnets 58.

The heads of the threaded fasteners 67, indicated by the reference numeral 72 are spans the openings in the protective sleeve 68 so as to affix it rigidly to the end wall 57 of the flywheel 55.

Adjacent the headed portion 72, the threaded fasteners 67 have a cylindrical pilot portion 73 that is received in and which aligns complimentary apertures 74 and 75 in the outer race 65 and flywheel end portion 57, respectively. As may be seen in FIG. 3, the inner portion of the threaded fasteners 65 are threaded and are received in the tapped openings 66 in the one-way clutch outer race 65.

Thus, it should be readily apparent that a lesser number of fasteners can be employed with this construction and the use of messy adhesives that require time for bonded can be eliminated by using the same threaded fasteners to affix the protective sleeve 69 around the inner periphery of the permanent magnets 58.

Thus, from the foregoing description it should be readily apparent that the preferred embodiment of the invention disclosed well meets the objects of the invention and provides a lower cost, higher strength and more easily manufactured flywheel rotor for a magneto generator. Of course, the foregoing description is that of a preferred embodiment of the invention and various changes and modifications may be made without departing from the spirit and scope of the invention, as defined by the appended claims.

What is claimed is:

1. A flywheel rotor of a magneto generator for an internal combustion engine for rotating together with a crankshaft of the engine said flywheel rotor comprising a boss member having a sleeve portion adapted to be nonrotatably secured on the crankshaft and a flange portion formed integrally with said sleeve portion, said flange portion being generally in the shape of a disc, an engine starter component disposed on one side of said flange portion, a flywheel member generally in the shape of a cup disposed on the other side of said flange portion, a plurality of circumferentially spaced permanent magnets affixed on the inner surface of said flywheel member and a plurality of threaded fasteners each having portions extending axially through each of said flange portion, said engine starter component and said flywheel and forming the sole connection between said flange portion and said engine starter component and forming the sole connection between said flywheel and each of said flange portion and said engine starter component.

2. A flywheel rotor of a magneto generator as set forth in claim 1 wherein the engine starter component comprises a component of a one-way clutch.

3. A flywheel rotor of a magneto generator as set forth in claim 2 wherein the one-way clutch component comprises an outer race.

4. A flywheel rotor of a magneto generator as set forth in claim 1 wherein each of the threaded fasteners comprises a headed portion, an unthreaded portion adjacent said headed portion, and a threaded portion spaced from said headed portion by said unthreaded portion, the diameter of said unthreaded portion being complimentary to the diameter of openings formed in the flywheel member and the boss member for alignment thereof.

5. A flywheel rotor of a magneto generator as set forth in claim 4 wherein the engine starter component has threaded openings for receiving the threaded portions of said threaded fasteners.

6. A flywheel rotor of a magneto generator as set forth in claim 5 wherein the engine starter component comprises a component of a one-way clutch.

7. A flywheel rotor of a magneto generator as set forth in claim 6 wherein the one-way clutch component comprises an outer race.

8. A flywheel rotor of a magneto generator as set forth in claim 1 further including a permanent magnet protection casing generally in the shape of a cup received within the flywheel in close contact with inner surfaces of the permanent magnets and affixed to said flywheel.

9. A flywheel rotor of a magneto generator as set forth in claim 8 wherein the permanent magnet protection casing is fixed to the flywheel by the threaded fasteners.

10. A flywheel rotor of a magneto generator for an internal combustion engine for rotating together with a crankshaft of the engine said flywheel rotor comprising a boss member having a sleeve portion adapted to be nonrotatably secured on the crankshaft and a flange portion formed integrally with said sleeve portion, said flange portion being generally in the shape of a disc, an engine starter component disposed on one side of said flange portion, a flywheel member generally in the shape of a cup disposed on the other side of said flange portion, a plurality of circumferentially spaced permanent magnets affixed on the inner surface of said flywheel member, a permanent magnet protection casing generally in the shape of a cup received within the flywheel having a cylindrical portion in close contact with inner surfaces of the permanent magnets and a flange portion abutingly engaged with a flange portion of said flywheel, and a plurality of fasteners fixing said engine starter component, said flywheel, said boss member and said permanent magnet protection casing to each other.

11. A flywheel rotor of a magneto generator as set forth in claim 10 wherein the plurality of fasteners comprise threaded fasteners each having portions extending axially through each of the flange portion, the engine starter component, the permanent magnet protection casing and the flywheel and forming the sole connection between said flange portion, said engine starter component, said permanent magnet protection casing and said flywheel.

* * * * *